(12) United States Patent
Schrader

(10) Patent No.: US 7,992,930 B2
(45) Date of Patent: Aug. 9, 2011

(54) VEHICLE HAVING A RECONFIGURABLE CARGO AREA

(75) Inventor: Michael A. Schrader, Plain City, OH (US)

(73) Assignee: Honda Motor Co., Ltd, Tokyo (JP)

( * ) Notice: Subject to any disclaimer, the term of this patent is extended or adjusted under 35 U.S.C. 154(b) by 14 days.

(21) Appl. No.: 12/625,983

(22) Filed: Nov. 25, 2009

(65) Prior Publication Data

US 2011/0121595 A1 May 26, 2011

(51) Int. Cl.
*B60J 7/047* (2006.01)
(52) U.S. Cl. .......... 296/220.01; 296/216.04; 296/216.05
(58) Field of Classification Search .......... 296/10, 296/24.3, 24.33, 24.43, 26.08, 37.1, 57.1, 296/100.03, 100.05, 100.12, 106, 137, 156, 296/165, 172, 176, 181.3, 182.1, 183.1, 191, 296/210, 216.04, 216.05, 220.01, 222
See application file for complete search history.

(56) References Cited

U.S. PATENT DOCUMENTS

| | | | |
|---|---|---|---|
| 3,782,776 A | 1/1974 | Ormont | |
| 5,209,543 A | 5/1993 | Harkins, Jr. | |
| 6,305,740 B1 * | 10/2001 | Staser et al. | 296/222 |
| 6,460,921 B2 * | 10/2002 | DeGaillard | 296/218 |
| 6,485,094 B2 | 11/2002 | Corder et al. | |
| 6,672,638 B2 | 1/2004 | Corder et al. | |
| 7,032,962 B2 | 4/2006 | Engelgau | |
| 7,055,879 B2 | 6/2006 | De Gaillard | |
| 7,399,030 B2 | 7/2008 | Reitzloff et al. | |
| 7,494,175 B2 | 2/2009 | Condon et al. | |
| 2004/0021344 A1 | 2/2004 | Beierl | |

FOREIGN PATENT DOCUMENTS

DE 19950434 A1 * 5/2001

* cited by examiner

*Primary Examiner* — J. Allen Shriver, II
*Assistant Examiner* — Jason Daniels
(74) *Attorney, Agent, or Firm* — Cliff Vaterlaus; Michael A. Forhan; Eley Law Firm Co.

(57) ABSTRACT

A vehicle having a reconfigurable cargo area. A tailgate selectably closes off a rear portion of the vehicle and is positionable between a generally vertical closed position and a generally horizontal open position. A roof is bifurcated along a longitudinal axis of the vehicle. A fixed roof panel closes off a first portion of the roof. A movable roof panel is slidable along a transverse axis of the vehicle, and has a closed position edgewise adjacent to the fixed roof panel and an open position facially adjacent to the fixed roof panel. In its closed position the movable roof panel closes off a second portion of the roof. The second roof portion is exposed when the movable roof panel is in its open position. The cargo area is configurable to closed and open arrangements according to the positions of the tailgate and the movable roof panel.

22 Claims, 9 Drawing Sheets

VEHICLE HAVING A RECONFIGURABLE CARGO AREA

FIELD

The present invention relates generally to vehicles, in particular to a vehicle having a cargo area that is reconfigurable between a closed arrangement and an open arrangement.

BACKGROUND

Small vehicles, such as compact and subcompact automobiles, often have a number of advantages over large vehicles. Among the advantages are fuel economy, sporty handling characteristics and ease of parking. A significant drawback of small vehicles, however, is limited cargo hauling capacity.

Vehicle manufacturers have attempted to increase the cargo hauling capacity of small vehicles in a number of ways, such as by providing folding and/or removable rear seats. While these features increase the cargo hauling capacity of small vehicles somewhat, it is still not possible to carry large or unwieldy objects due to the physical constraints of the cargo compartment, which is usually defined by a deck floor, a pair of spaced-apart body sidewalls and a roof. Furthermore, it is inconvenient and can require significant effort to remove the seats from the vehicle, to say nothing of the logistics often required to temporarily store the removed seats and then retrieve and reinstall them once the cargo has been unloaded.

Another attempt to increase the cargo hauling capacity of small vehicles is by including a pass-through opening in the rear seats of the vehicle. The opening is typically accessed by folding a portion of the rear seats. While useful for hauling lengthy objects such as lumber and skis, the opening is relatively small and is of little use for hauling large objects such as boxes and bicycles.

Many small vehicles now have roof-mounted luggage racks for carrying large objects. The objects are placed onto the rack and are usually secured to siderails of the rack with rope or straps. However, this has its drawbacks. For example, the cargo is subject to falling from the vehicle during transport.

Faced with the aforementioned shortcomings, many small vehicle owners simply raise a rear liftback door of the vehicle to an open position and allow the cargo to extend out of the rear of the vehicle. This creates the potential for damage to a window portion of the liftback unless the cargo is properly secured. Furthermore, the cargo is subject to falling from the vehicle during transport, and can also be a safety hazard if the vehicle is involved in a traffic accident There is a need for a safe and convenient way to haul large objects with a small vehicle.

SUMMARY

A vehicle having a reconfigurable cargo area is disclosed according to an embodiment of the present invention. The cargo area includes a drop-down tailgate having a retractable window. In addition, a vehicle roof is longitudinally bifurcated into a fixed roof panel and a movable roof panel. When large objects are to be hauled by the vehicle the window is retracted into the tailgate and the tailgate is moved to a generally horizontal open position, while the movable roof panel is slidably moved to an open position facially adjacent to the fixed roof panel. Together the open positions of the tailgate and the roof panel provide a cargo area to safely and conveniently accommodate large cargo.

In one embodiment of the present invention a vehicle has a reconfigurable cargo area. A tailgate selectably closes off a rear portion of the vehicle and is positionable between a generally vertical closed position and a generally horizontal open position. A roof is bifurcated along a longitudinal axis of the vehicle. A fixed roof panel closes off a first portion of the roof. A movable roof panel is slidable along a transverse axis of the vehicle, and has a closed position edgewise adjacent to the fixed roof panel and an open position facially adjacent to the fixed roof panel. In the closed position the movable roof panel closes off a second portion of the roof. The second roof portion is exposed when the movable roof panel is in the open position. The cargo area is configurable to closed and open arrangements according to the positions of the tailgate and the movable roof panel.

Another embodiment of the present invention is a method for reconfiguring a cargo area of a vehicle. The method includes the step of selectably closing off a rear portion of the vehicle with a tailgate, the tailgate having a bottom edge pivotably attached to the vehicle and being selectably positionable between a generally vertical closed position and a generally horizontal open position. A roof is bifurcated along a longitudinal axis of the vehicle. An elongated, fixed roof panel and an elongated, movable roof panel are provided, a longitudinal axis of each of the fixed and movable roof panels being generally aligned with the longitudinal axis of the vehicle. The fixed roof panel closes off a first portion of the roof. The movable roof panel is slidable along a transverse axis of the vehicle between a closed position edgewise adjacent to the fixed roof panel and an open position facially adjacent to the fixed roof panel. The movable roof panel closes off a second roof portion in its closed position, and the second roof portion is exposed when the movable roof panel is in its open position. The cargo area is configurable to a closed arrangement when the tailgate is in its closed position and the movable roof panel is in its closed position. The cargo area is further configurable to an open arrangement when the tailgate is in its open position and the movable roof panel is in its open position.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
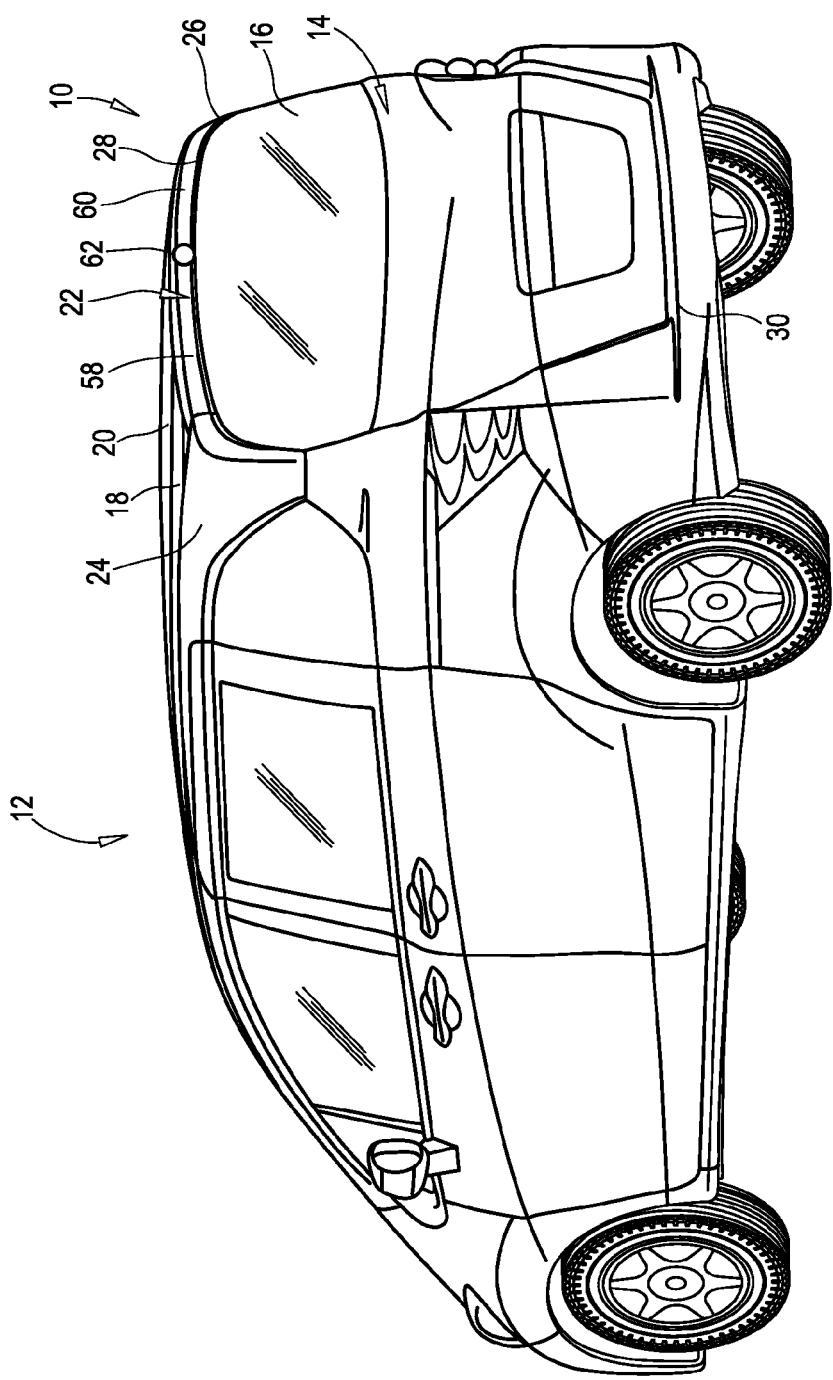
FIG. 1 is a rear perspective view of a vehicle having a reconfigurable cargo area according to an embodiment of the present invention, the cargo area being shown in a closed arrangement.
Figure 2:
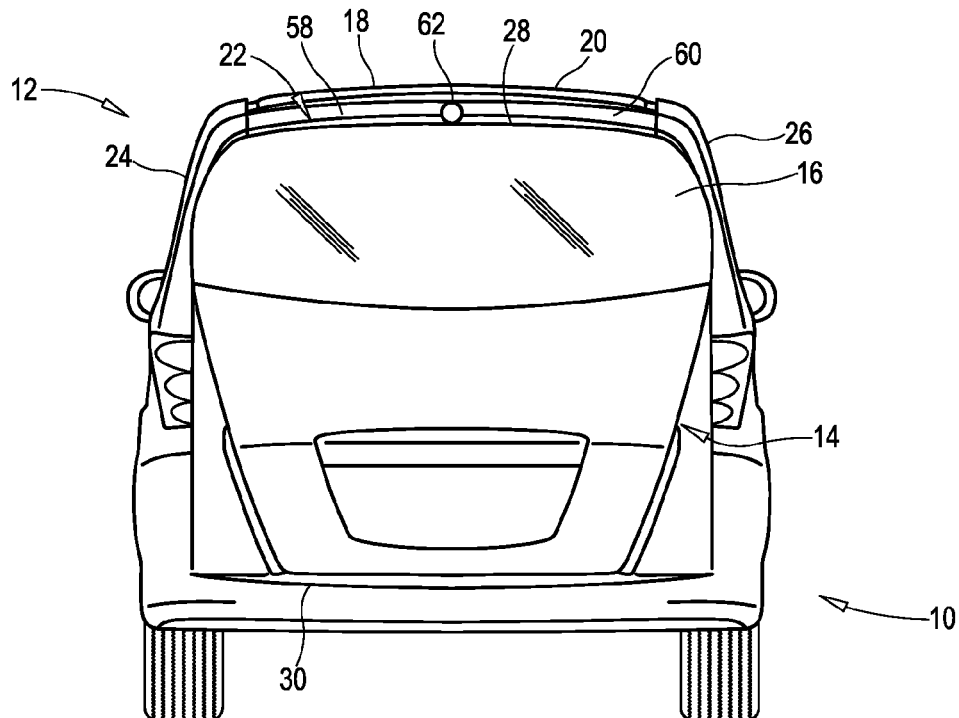
FIG. 2 is a rear elevational view of the vehicle of FIG. 1.
Figure 3:
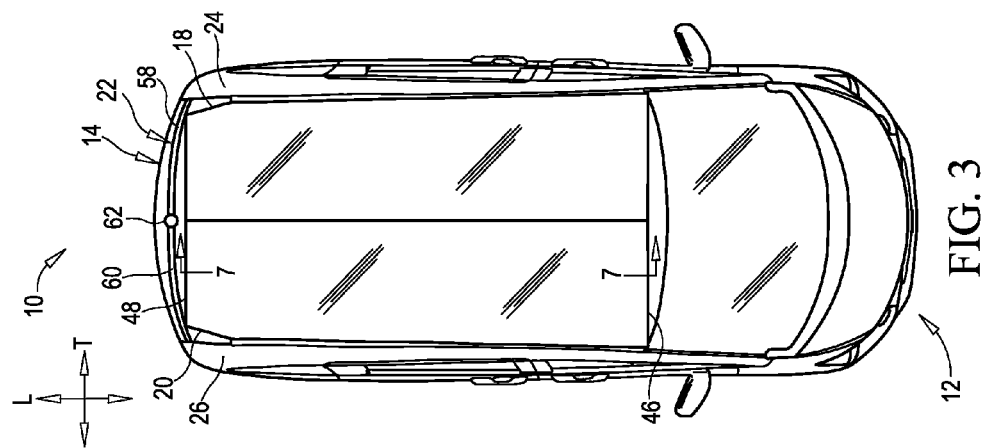
FIG. 3 is a top plan view of the vehicle of FIG. 1.

The general arrangement of a reconfigurable cargo area 10 for a vehicle 12 is shown in FIGS. 1 through 3. Cargo area 10 includes a tailgate 14 having a retractable window 16, a fixed, elongated roof panel 18 and a movable, elongated roof panel 20. A rear cross member 22 extends between a first body sidewall 24 and an opposing second body sidewall 26 of vehicle 12 and is interposed between roof panels 18, 20 and an upper edge 28 of window 16.

Figure 4:
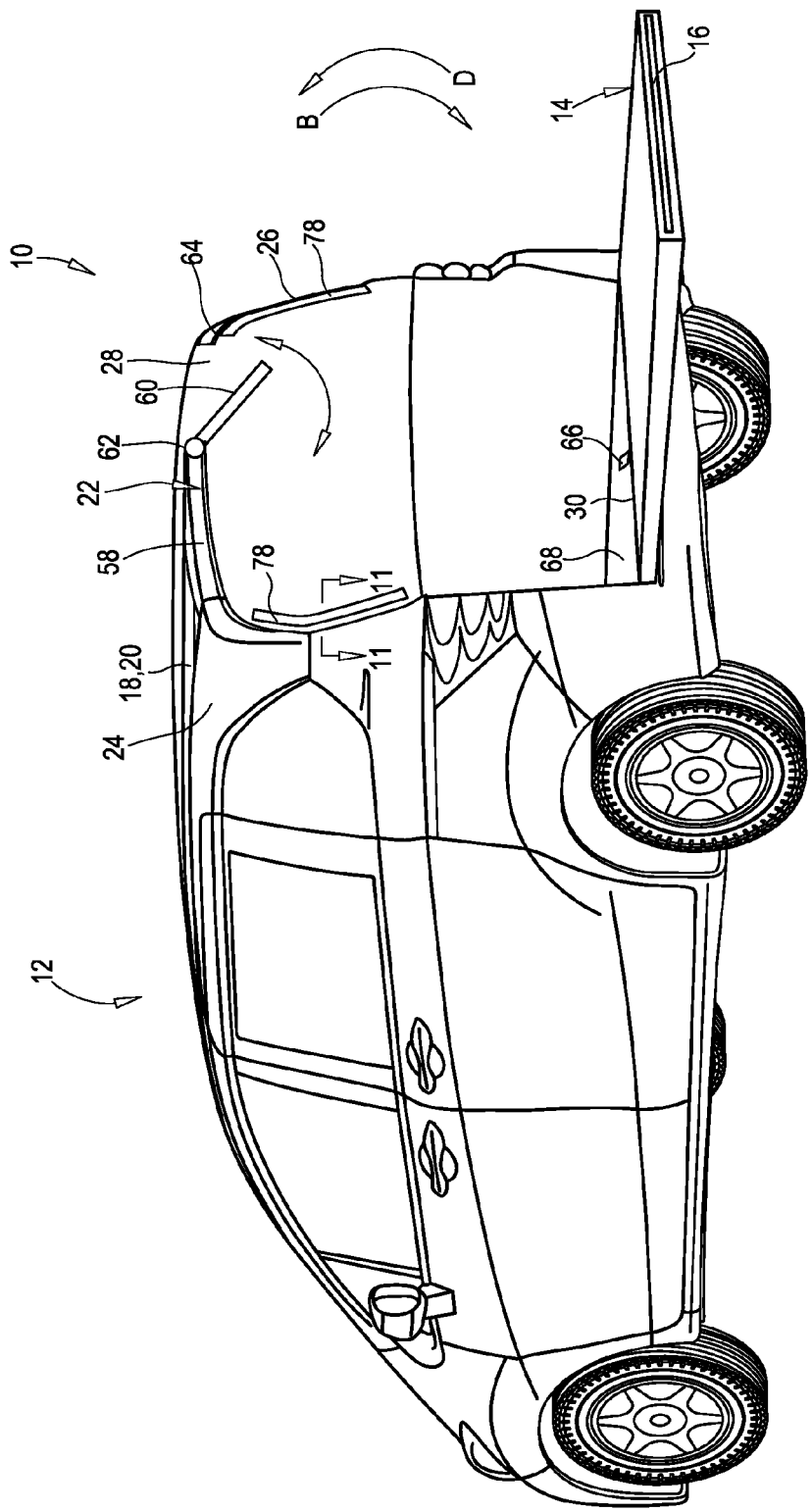
FIG. 4 is a partial rear perspective view of the vehicle of FIG. 1 with its cargo area being reconfigured between its closed arrangement and an open arrangement.
Figure 5:
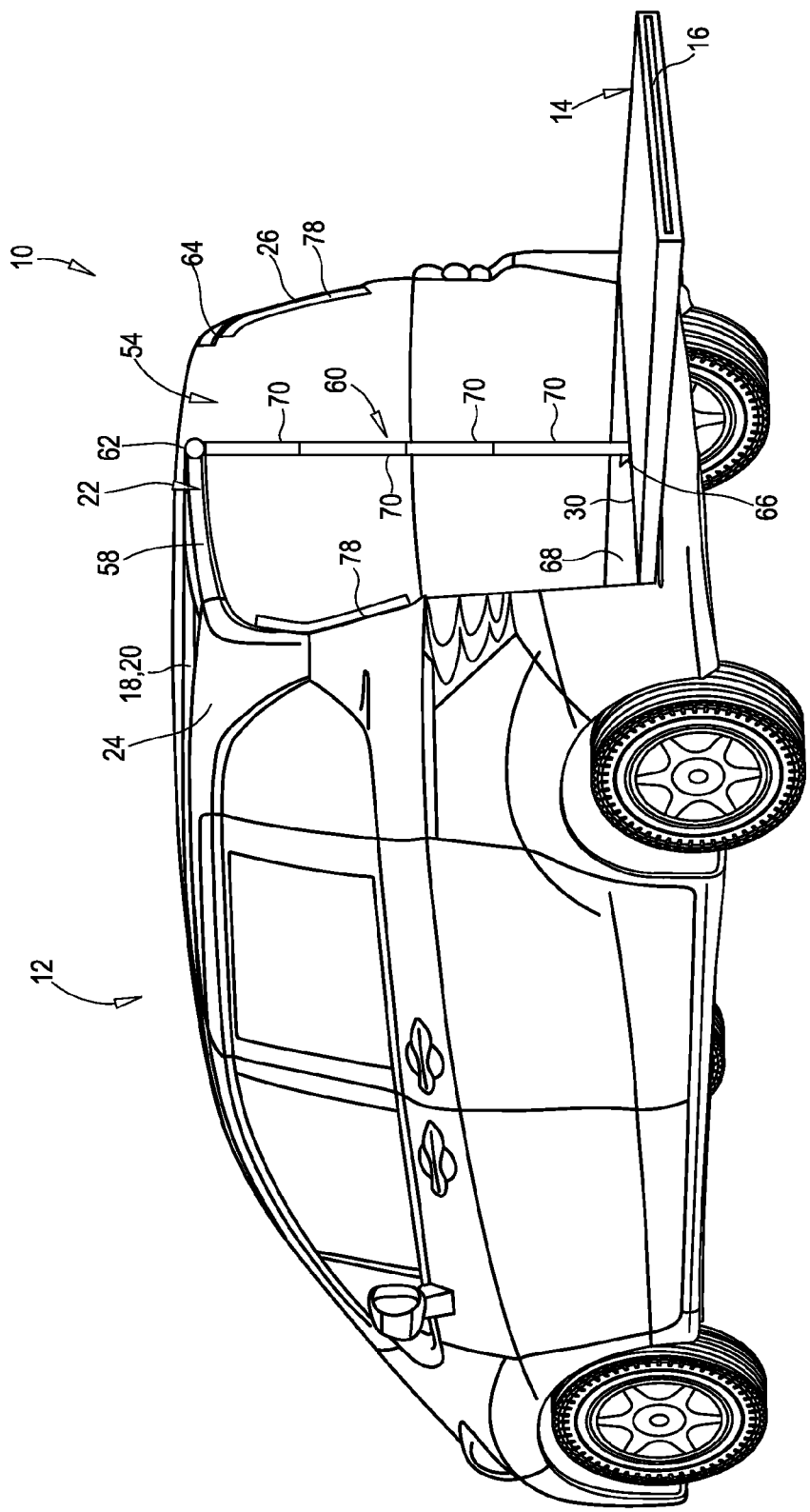
FIG. 5 shows the vehicle of FIG. 4 fully reconfigured to its open arrangement.

With additional reference to FIGS. 4 and 5, tailgate 14 selectably closes off a rear portion of vehicle 12. Tailgate 14 is pivotably attached at its lower edge 30 to vehicle 12 and is selectably positionable between a generally vertical closed position, shown in FIGS. 1 and 2, and a generally horizontal open position, shown in FIGS. 4 and 5. Window 16 is coupled to tailgate 14 and is selectably movable between an extended position adjacent to rear cross member 22, as shown in FIGS. 1 and 2, and a retracted position within tailgate 14 as shown in FIGS. 4 and 5.

Figure 6:
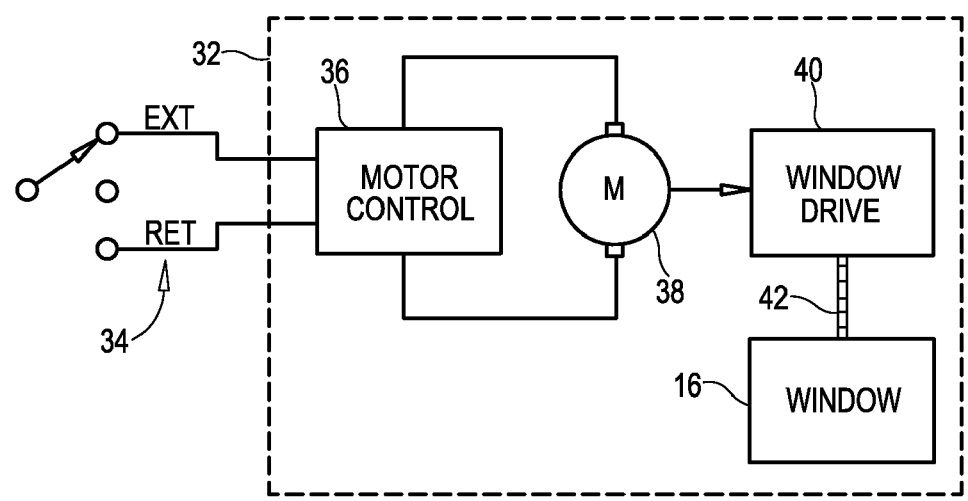
FIG. 6 is a schematic block diagram showing the general arrangement of a window regulator according to an embodiment of the present invention.

With further reference to FIG. 6, extension and retraction of window 16 with respect to tailgate 14 is preferably accomplished with a conventional electric power window regulator such as regulator system 32, operated by a switch 34 accessible to a user of the vehicle. Regulator system 32 includes a motor control 36 to selectably supply electrical power to control the actuation of an electric motor 38. An output of motor 38 provides mechanical input power to a window drive 40, which may include a drive cable 42 coupled to window 16 to move the window between its retracted and extended positions.

With reference again to FIG. 3 a bifurcated roof of vehicle 12 includes fixed roof panel 18 and movable roof panel 20, a longitudinal axis of each of the roof panels being generally aligned with a longitudinal axis "L" of the vehicle and dividing the roof along the longitudinal axis "L." Fixed roof panel 18 and movable roof panel 20 may be made of any desired combination of metal or opaque plastic, and may be finished by painting, coating, plating or molding-in colors as appropriate to the material to match or complement the finish of vehicle 12. Alternatively, either or both of fixed roof panel 18 and movable roof panel 20 may be made of a suitable transparent glass or plastic, which may be tinted if desired.

Figure 7:
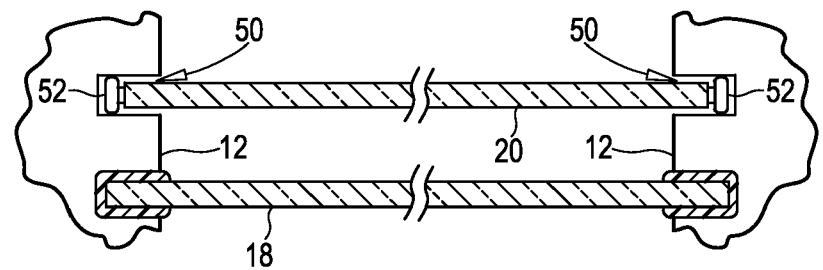
FIG. 7 is a view in section of a movable roof panel and an associated track according to an embodiment of the present invention.
Figure 8:
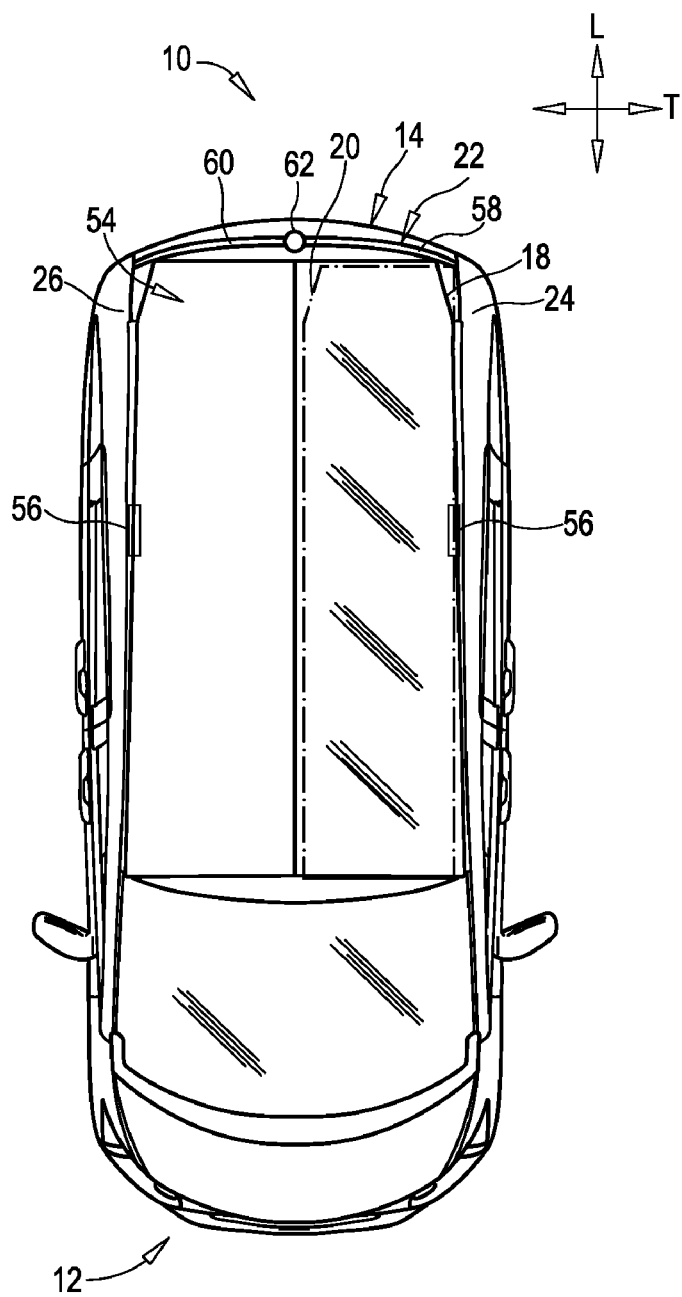
FIG. 8 is a top plan view of the vehicle of FIG. 1, showing the movable roof panel positioned facially adjacent to a fixed roof panel.

Movable roof panel 20 includes a forward edge 46 and a rear edge 48, and moves slidably along a transverse axis "T" of the vehicle, guided by a pair of opposing grooves or tracks 50 of the roof of vehicle 12, as shown in FIGS. 3 and 7. A set of wheels 52 may be attached to movable roof panel 20 to reduce the effort required to move the roof panel along tracks 50. In a closed position movable roof panel 20 is edgewise adjacent to fixed roof panel 18, as shown in FIGS. 2 and 3. In an open position movable roof panel 20 is slidably moved along tracks 50 to a position either over or under fixed roof panel 18 and facially adjacent to the fixed roof panel, exposing an opening 54 in the roof of vehicle 10 as shown in FIG. 8.

Movement of movable roof panel 20 may be accomplished manually by urging the movable roof panel along the tracks 50. Alternatively, movement of movable roof panel 20 between its open and closed positions may be accomplished using an embodiment of regulator 32 (FIG. 6) and operated by a switch similar to switch 34 (FIG. 6) accessible to a user of the vehicle. In this embodiment switch 34 may be keyed, if desired, and drive cable 42 of regulator 32 may be attached to either or both of forward edge 46 and rear edge 48 of movable roof panel 20. One or more roof latches 56, shown in FIG. 8, may be provided to selectably secure movable roof panel 20 in its open and closed positions.

With reference again to FIGS. 1, 4 and 5, rear cross member 22 includes a fixed portion 58 that is adjacent to first body sidewall 24 and fixed roof panel 18, and a movable portion 60 that is adjacent to second body sidewall 26 and movable roof panel 20 when the movable roof panel is in its closed position. Movable portion 60 is pivotable about a hinge 62 between a generally horizontal stowed position (FIG. 1), detachably secured to second body sidewall 26 with a sidewall latch 64 (FIG. 4), and a generally vertical extended position, where it is detachably latched to a deck latch 66 of a deck 68 of vehicle 12 (FIG. 5). Movable portion 60 is preferably adjustable in length, such as with a plurality of telescopic sections 70, to extend between hinge 62 and deck 68. In alternative embodiments of the present invention movable portion 60 may be detachably linked to deck 68, rotatable to fold over and detachably couple to fixed portion 58 of rear cross member 22, or removable from vehicle 12 altogether.

Figure 9:
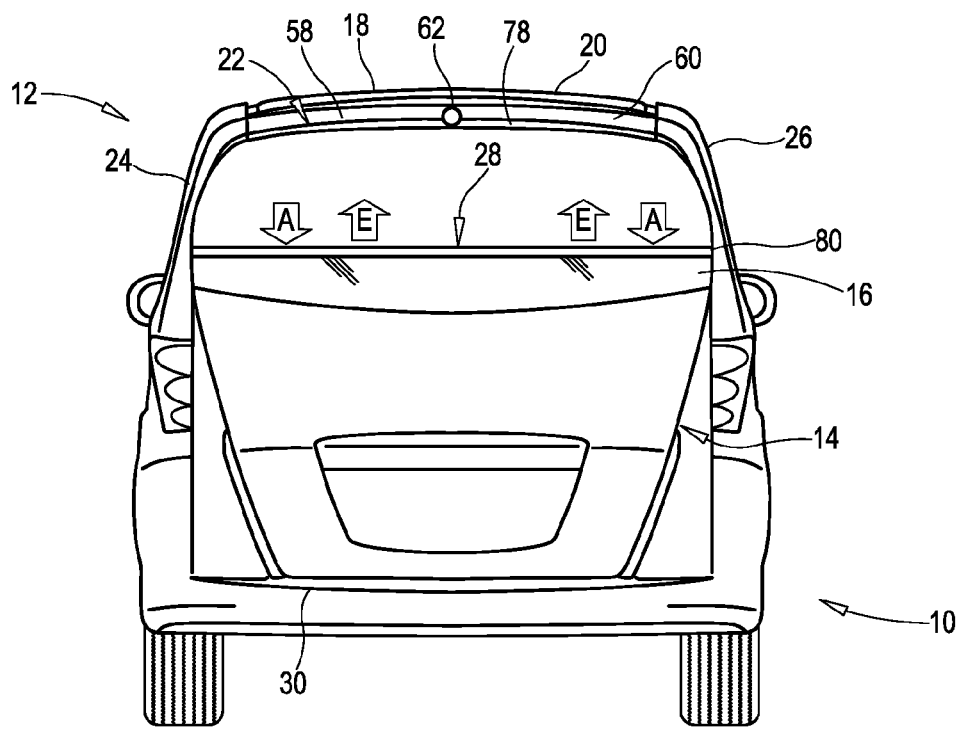
FIG. 9 is a rear elevational view of the vehicle of FIG. 1, showing a window being moved with respect to a tailgate.

Cargo area 10 is shown in a closed arrangement in FIGS. 1 through 3. To reconfigure cargo area 10 to an open arrangement, window 16 is retracted into tailgate 14, as illustrated by arrows "A" in FIG. 9, tailgate 14 is lowered to its generally horizontal open position as shown by arrow "B" in FIG. 4, movable portion 60 of rear cross member 22 is moved from its stowed position to its extended position, and movable roof panel 20 is slidably moved along transverse axis "T" of vehicle 12 to its open position facially adjacent to fixed roof panel 18 as indicated by arrows "C" in FIG. 10. Movable roof panel 20 is shown in its fully deployed position facially adjacent to fixed roof panel 18 in FIG. 8. In the open arrangement of cargo area 10, shown in FIG. 5, large objects may be stowed in vehicle 12, resting upon deck 68 and tailgate 14 and extending upwardly through roof opening 54. It will be appreciated that the foregoing steps to reconfigure cargo area 10 to its open arrangement may be accomplished in different order in alternative embodiments of the present invention.

The passenger compartment of vehicle 12 may be also be reconfigured as needed to further accommodate cargo stowed in cargo area 10. For example, select seats may be moved toward the front or rear of the vehicle to make room for the cargo. In addition, seatbacks of select seats may be folded to a generally horizontal position over seat cushions of the seats to provide a resting surface for cargo. Alternatively, the seats may include a fold-and-tip feature wherein the seatbacks are folded over the seat cushions and the seats are pivoted about a pair of mounting points to a stowed position, increasing the portion of deck 68 that is available for receiving cargo. Lastly, the seats may be removed, if desired, to increase the portion of deck 68 that is available for receiving cargo.

To reconfigure cargo area 10 from its open arrangement to its closed arrangement, movable portion 60 of rear cross member 22 is moved from its extended position to its horizontal stowed position (FIG. 4). Movable roof panel 20 is slidably moved along transverse axis "T," away from fixed roof panel 18 to its stowed position as indicated by arrows "F" in FIG. 10. Tailgate 14 is raised to its generally vertical closed position as shown by arrow "D" in FIG. 4, and window 16 is extended from tailgate 14 as illustrated by arrows "E" in FIG. 9. Movable roof panel 20 is shown in its fully stowed position in FIG. 3. The closed arrangement of cargo area 10 is shown in FIGS. 1 through 3. It will be appreciated that the foregoing steps to reconfigure cargo area 10 to its closed arrangement may be accomplished in different order in alternative embodiments of the present invention.

Figure 13:
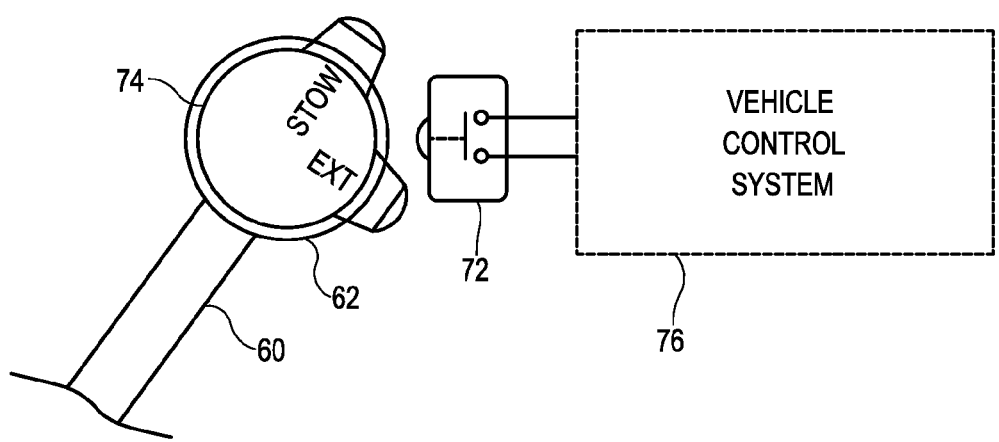
FIG. 13 is a schematic block diagram of a safety interlock according to an embodiment of the present invention.

In some embodiments of the present invention any or all of rear cross member 22, sidewall latch 64 and deck latch 66 may include a safety interlock 72 to prevent vehicle 12 from being started when rear cross member movable portion 60 is not in either its stowed or extended positions. An example schematic block diagram incorporating a safety interlock 72 into hinge 62 is shown in FIG. 13. An actuator 74 is coupled to rear cross member movable portion 60 at a convenient location, such as at hinge 62. Safety interlock 72 is actuated by an actuator 74 when rear cross member movable portion 60 is in either the stowed ("STOW") or the extended ("EXT") position, generating a logical electrical signal that is provided to a vehicle control system 76 indicating that the movable cross member portion is in a safe condition for vehicle operation. Various alternate safety interlock arrangements to monitor the position of rear cross member movable portion 60 and limit starting of vehicle 12 in a predetermined manner may be contemplated by the artisan within the scope of the invention.

Figure 10:
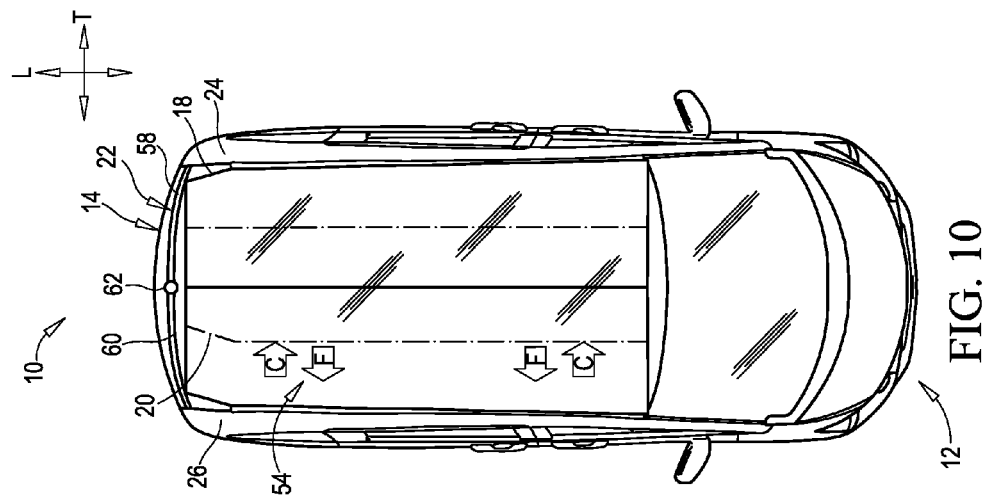
FIG. 10 is a top plan view of the vehicle of FIG. 1 showing the movable roof panel being moved with respect to the fixed roof panel.

It should be noted that cargo area 10 includes a number of alternate embodiments in addition to those discussed above. With reference to FIGS. 1, 8 and 10, an example alternate open arrangement of cargo area 10 includes moving movable roof panel 20 to its open position with tailgate 14 remaining in its closed position and with window 16 in either its extended or retracted position, or omitted altogether. Likewise, tailgate 14 may instead be a fixed body portion closing off the rear portion of the vehicle 12, with or without a window 16. Movable portion 60 of rear cross member 22 may optionally be included in these various embodiments.

Figure 11:
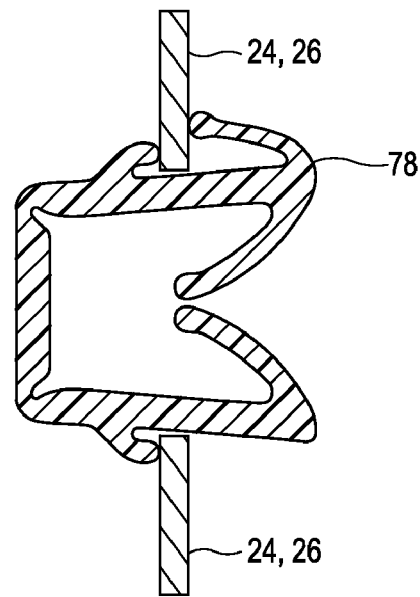
FIG. 11 is a view in section of a window side seal according to an embodiment of the present invention.
Figure 12:
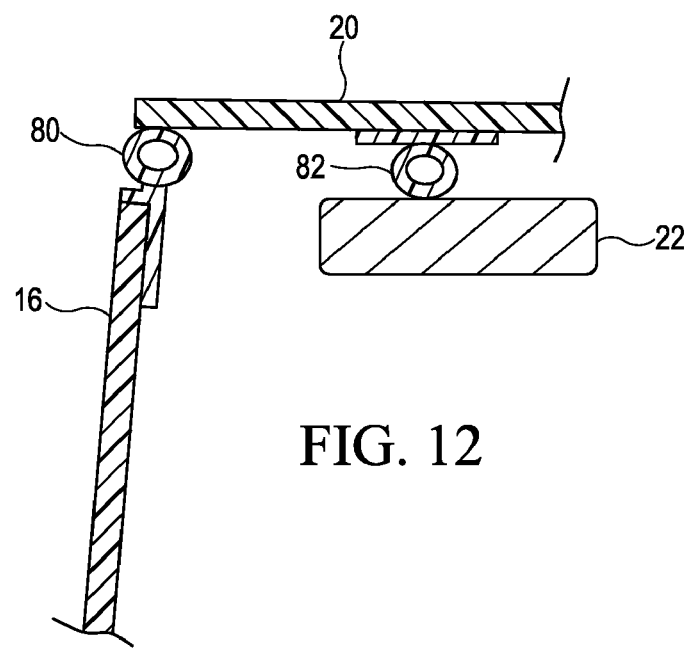
FIG. 12 is a view in section of a window top seal and a roof seal according to an embodiment of the present invention.

In some embodiments of the present invention cargo area 10 may include one or more seals to better isolate the interior of vehicle 12 from the environment when the cargo area is in the closed arrangement of FIGS. 1 through 3. For example, a pair of window side seals 78, shown in FIGS. 4 and 11, may be attached to first and second body sidewalls 24, 26 to seal between the body sidewalls and adjacent side edges of window 16. Similarly, a window upper seal 80, shown in FIGS. 9 and 12, may be attached to window 16 and contact roof panels 18, 20 in the closed arrangement as shown in FIG. 12. Furthermore, either or both of roof panels 18, 20 may include a roof seal 82 between the roof panels and rear cross member 22, as shown in FIG. 12.

While this invention has been shown and described with respect to a detailed embodiment thereof, it will be understood by those skilled in the art that changes in form and detail thereof may be made without departing from the scope of the claims of the invention.

What is claimed is:

1. A vehicle having a reconfigurable cargo area, comprising:
    a tailgate selectably closing off a rear portion of the vehicle, the tailgate having a bottom edge pivotably attached to the vehicle and being selectably positionable between a generally vertical closed position and a generally horizontal open position;
    a roof bifurcated along a longitudinal axis of the vehicle, the roof including an elongated, fixed roof panel and an elongated, movable roof panel, a longitudinal axis of each of the fixed and movable roof panels being generally aligned with the longitudinal axis of the vehicle,
    the fixed roof panel closing off a first portion of the roof and the movable roof panel being slidable along a transverse axis of the vehicle between a closed position edgewise adjacent to the fixed roof panel and an open position facially adjacent to the fixed roof panel, the movable roof panel closing off a second roof portion in its closed position, the second roof portion being exposed when the movable roof panel is in its open position,
    the cargo area being configurable to a closed arrangement when the tailgate is in its closed position and the movable roof panel is in its closed position, and the cargo area being configurable to an open arrangement when the tailgate is in its open position and the movable roof panel is in its open position.

2. The vehicle of claim 1, further comprising a window coupled to the tailgate, the window being selectably movable between a retracted position within the tailgate and an extended position extending from the tailgate.

3. The vehicle of claim 2, further including:
    a pair of spaced-apart, opposing body sidewalls, the window being positioned between the sidewalls with the tailgate in the closed position; and
    a pair of side seals, each side seal being interposed between a side edge of the window and an adjacent sidewall.

4. The vehicle of claim 2, further including an upper seal attached to an upper edge of the window.

5. The vehicle of claim 1, further comprising:
    a first body sidewall;
    a second body sidewall spaced apart from and opposing the first body sidewall;
    a deck; and
    a rear cross member having a fixed portion, a movable portion and a hinge joining the fixed and movable portions, the rear cross member being adjacent to the fixed and movable roof panels and extending between the first and second body sidewalls, the fixed portion extending between the first body sidewall and the hinge, the movable portion extending between the hinge and the second body sidewall, the movable portion being pivotable between a generally horizontal stowed position and a generally vertical extended position, the movable portion engaging the deck in the extended position.

6. The vehicle claim 5, further comprising a sidewall latch to selectably secure the movable portion of the rear cross member to the second sidewall when the movable portion is in its stowed position.

7. The vehicle of claim 5 wherein the movable portion of the rear cross member further includes a plurality of telescopic sections.

8. The vehicle of claim 5, further including a roof seal between at least one of the fixed and movable roof panels and the rear cross member.

9. The vehicle of claim 5, further comprising an interlock coupled to the movable portion of the rear cross member, the interlock generating a logical electrical signal indicating when the movable cross member portion is in one of its stowed and extended positions.

10. The vehicle of claim 1, the roof further comprising a pair of spaced-apart, opposing tracks, the movable roof panel being slidably movable along the tracks.

11. The vehicle of claim 1, further comprising a window regulator to move the window between its extended and retracted positions.

12. The vehicle of claim 1, further comprising a window regulator to move the movable roof panel between its closed and open positions.

13. The vehicle of claim 1, further comprising at least one roof latch to selectably secure the movable roof panel in its open and closed positions.

14. The vehicle of claim 1 wherein at least one of the fixed and movable roof panels are made from at least one of metal and opaque plastic materials.

15. The vehicle of claim 14 wherein the metal and opaque plastic materials are finished.

16. The vehicle of claim 1 wherein at least one of the fixed and movable roof panels are made from at least one of transparent glass and plastic materials.

17. The vehicle of claim 16 wherein the glass and plastic materials are tinted.

18. A vehicle with a reconfigurable cargo area, comprising:
a first body sidewall;
a second body sidewall spaced apart from and opposing the first body sidewall;
a deck;
a tailgate selectably closing off a rear portion of the vehicle, the tailgate having a bottom edge pivotably attached to the vehicle and being selectably positionable between a generally vertical closed position and a generally horizontal open position;
a window coupled to the tailgate, the window being selectably movable between a retracted position within the tailgate and an extended position extending from the tailgate;
a roof bifurcated along a longitudinal axis of the vehicle, the roof including an elongated, fixed roof panel and an elongated, movable roof panel, a longitudinal axis of each of the fixed and movable roof panels being generally aligned with the longitudinal axis of the vehicle,
the fixed roof panel closing off a first portion of the roof and the movable roof panel being slidable along a transverse axis of the vehicle between a closed position edgewise adjacent to the fixed roof panel and an open position facially adjacent to the fixed roof panel, the movable roof panel closing off a second roof portion in its closed position, the second roof portion being exposed when the movable roof panel is in its open position; and
a rear cross member having a fixed portion, a movable portion and a hinge joining the fixed and movable portions, the rear cross member being adjacent to the fixed and movable roof panels and extending between the first and second body sidewalls, the fixed portion extending between the first body sidewall and the hinge, the movable portion extending between the hinge and the second body sidewall, the movable portion being pivotable between a generally horizontal stowed position and a generally vertical extended position, the movable portion engaging the deck in the extended position,
the cargo area being configurable to a closed arrangement when the tailgate is in its closed position, the window is in its extended position, the movable roof panel is in its closed position and the movable portion of the rear cross member is in its stowed position, and
the cargo area being configurable to an open arrangement when the tailgate is in its open position, the window is in its retracted position, the movable roof panel is in its open position and the movable portion of the rear cross member is in its extended position.

19. The vehicle of claim 18, further comprising a sidewall latch to selectably secure the movable portion of the rear cross member to the second sidewall.

20. The vehicle of claim 18 wherein the movable portion of the rear cross member further includes a plurality of telescopic sections.

21. The vehicle of claim 18, roof further comprising a pair of opposing tracks, the movable roof panel being slidably movable along the tracks.

22. A method for reconfiguring a cargo area of a vehicle, comprising the steps of:
selectably closing off a rear portion of the vehicle with a tailgate, the tailgate having a bottom edge pivotably attached to the vehicle and being selectably positionable between a generally vertical closed position and a generally horizontal open position;
bifurcating a roof along a longitudinal axis of the vehicle;
providing an elongated, fixed roof panel and an elongated, movable roof panel, a longitudinal axis of each of the fixed and movable roof panels being generally aligned with the longitudinal axis of the vehicle,
the fixed roof panel closing off a first portion of the roof and the movable roof panel being slidable along a transverse axis of the vehicle between a closed position edgewise adjacent to the fixed roof panel and an open position facially adjacent to the fixed roof panel, the movable roof panel closing off a second roof portion in its closed position, the second roof portion being exposed when the movable roof panel is in its open position,
the cargo area being configurable to a closed arrangement when the tailgate is in its closed position and the movable roof panel is in its closed position, and the cargo area being configurable to an open arrangement when the tailgate is in its open position and the movable roof panel is in its open position.

* * * * *